Dec. 1, 1953  P. H. GORDON  2,660,977
FLIGHT INSTRUMENT
Filed Oct. 28, 1949  2 Sheets-Sheet 1

Inventor:
P. H. GORDON,
By Charles L. Sturtevant
Attorney

Dec. 1, 1953 P. H. GORDON 2,660,977
FLIGHT INSTRUMENT
Filed Oct. 28, 1949 2 Sheets-Sheet 2

Inventor:
P. H. GORDON,
By Charles L. Sturtevant
Attorney

Patented Dec. 1, 1953

2,660,977

UNITED STATES PATENT OFFICE 2,660,977

FLIGHT INSTRUMENT

Prince H. Gordon, North Merrick, N. Y.

Application October 28, 1949, Serial No. 124,223

1 Claim. (Cl. 116—124)

The present invention relates to new and useful improvements in navigational instruments for vehicles, particularly aircraft, and is concerned more specifically with the provision of a composite flight instrument including several grouped indicators.

When flying "blind" or "on instruments" one of the most essential and perhaps most difficult problem is to maintain the proper flight attitude of the aircraft because under such conditions the pilot may lose his sense of true vertical which may result in the aircraft assuming dangerous attitudes—often uncontrollable. Efforts are being constantly made to increase the safety of instrument flying occasioned by adverse weather conditions of poor or zero visibility or when flying blind at night when no land or celestial markings are available. Similar efforts are being made to assist the pilot, when flying under such conditions, by various groupings of instruments. When taking off and when making instrument approaches and more particularly when landing under such conditions, the utmost in concentration and in correct reading of instruments is required of the pilot who must concentrate on several instruments at this time. In general, the present invention is concerned with a grouping of the most important instruments required for instrument flight and concentrating these instruments as a group in the most convenient location on the instrument panel to facilitate view thereof and concentration thereon by the pilot. More specifically, however, the invention is concerned with the relative location of these pre-selected instruments with respect to the artificial horizon indicator which is probably the most important single instrument in blind flying and landing, particularly when being "talked in" by "G. C. A." (ground controlled approach) or when landing by radio beam.

With the above in mind, one of the principal objects of the present invention is to provide an improved flight instrument which is constructed and arranged to assist the pilot during maneuvering of the aircraft by minimizing conscious concentration on the aircraft attitude.

Another object of the present invention is to provide a flight instrument of the above type having the aircraft attitude indicator, which is known as the Gyro Horizon or Artificial Horizon, arranged in such prominence with respect to the other instruments that it is subconsciously apparent to the pilot at all times without specific concentration thereon.

A further object of the invention is to provide a flight instrument substantially of the above type including several pre-selected indicators arranged as a group in the direct view of the pilot with at least one of the indicators being visible throughout the extent of the group.

A still further object of the invention is to provide a flight instrument substantially of the above type wherein the attitude indicator in the form of an artificial horizon is movable in a place spaced from the other indicators of the group so as to be visible in juxtaposed relation thereto.

A still further object of the invention is to provide a flight instrument substantially of the above type wherein the artificial horizon indicator is visible substantially throughout the transverse extent of a plurality of grouped indicators.

A still further object of the invention is to provide a flight instrument having a plurality of grouped indicators arranged as a background with an attitude indicator movable with respect thereto as a foreground whereby to be constantly and subconsciously impressed on the pilot even while concentrating on some other indicator in the background.

The invention still further aims to provide a flight instrument substantially of the above type wherein the movable and stationary transversely extending arms of the aircraft attitude indicator are luminous, so as to facilitate view thereof by the pilot as a foreground over the grouped indicators making up the background.

The above and other objects of the present invention will in part be obvious and will be hereinafter more fully pointed out.

In the accompanying drawings wherein like reference numerals refer to like parts throughout the several views, Figure 1 is a front elevation showing the grouped indicators of the flight instrument forming the subject matter of the present invention;

Figure 4:
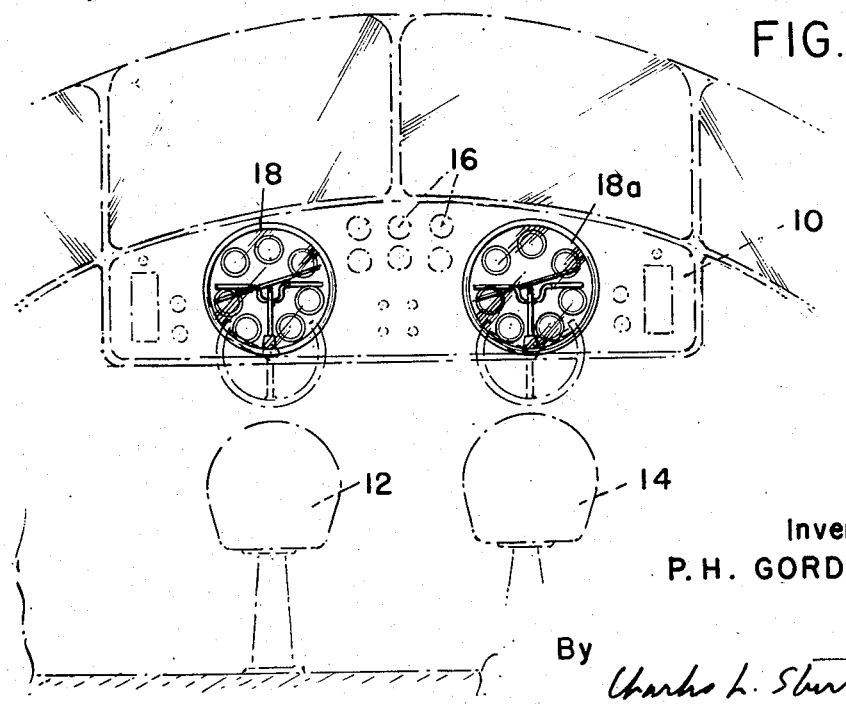
Figure 4 is a fragmentary interior view looking forwardly of an airplane and showing pilot and co-pilot seat positions with the composite flight instruments on the instrument panel in advance of and in line with the seat positions.

Referring more in detail to the accompanying drawings, and particularly to Figure 4 at this time, there is illustrated the interior of an airplane looking forwardly at the instrument panel 10 extending between the pilot's and co-pilot's seats 12, 14, respectively. The instrument panel includes conventional instruments and indicators designated generally by the numerals 16 and it is unnecessary to refer to these instruments or indicators in detail. It is to be noted that the instrument panel 10 includes two groups 18, 18a of indicators mounted on box-like supporting structures 20, 20a, respectively, and disposed in frontal direct line of view of the seat positions of the pilot and co-pilot so that each particular group of indicators forms a prominently arranged concentration of indicators and instruments in front of the pilot and co-pilot.

Figure 1:
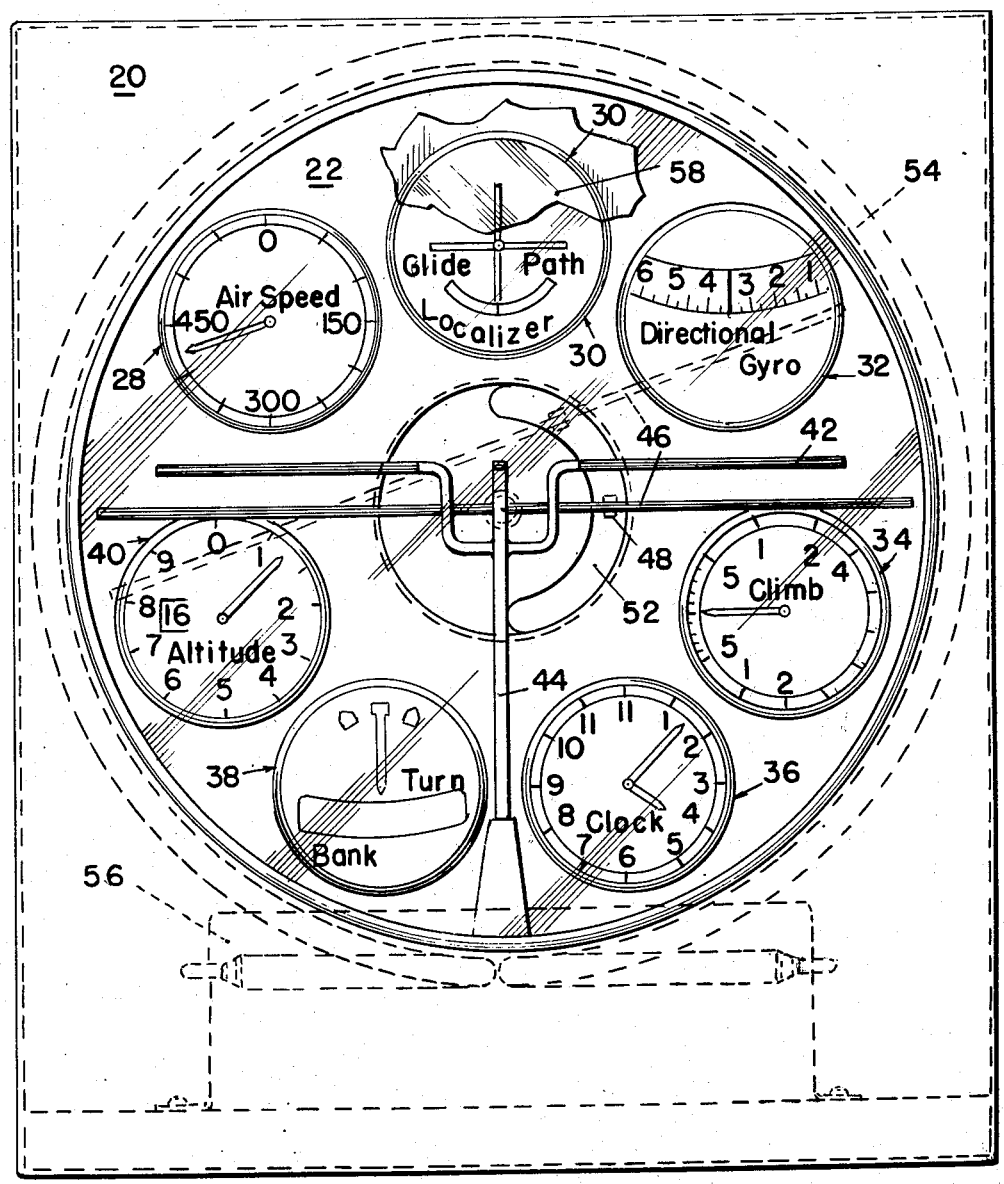
Figure 2:
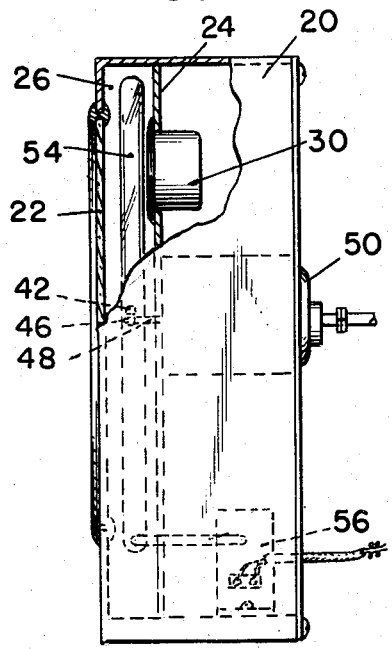
Figure 2 is a reduced side view of Figure 1 with a portion thereof broken away and in section.
Figure 3:
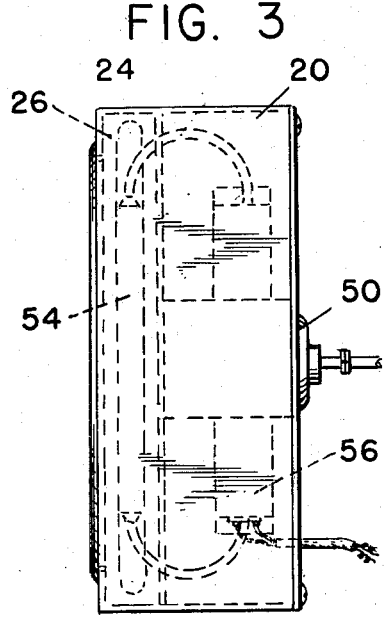
Figure 3 is a top plan view of Figure 2.

Each group 18, 18a of instruments is identical and the description of one will be sufficient, reference being had to Figures 1, 2 and 3 wherein the group 18 is shown in detail. The box-like housing 20 is adapted to be mounted on the instrument or flight panel 10 and is provided with a front cover glass 22 and a supporting partition 24 therebehind, thus providing a chamber 26 immediately behind the cover glass 22. The particular pre-selection of indicators to be mounted on the partition 24 may vary to some extent but for the purposes of blind flying and particularly blind landing, the present illustrated selection includes an air speed indicator 28; a glide path and localizer 30; a directional gyro indicator 32; a rate of climb indicator 34; a chronometer 36; a turn and bank indicator 38, and an altitude indicator 40. These several instruments are illustrated as being arranged in a circle but the arrangement might be square or rectangular or other form lending itself to provide a background of several of the most important instruments concentrated in a group easily viewable as a whole by the pilot.

As a contrasting foreground for the background of grouped instruments, there is provided within the chamber 26 an horizon indicator consisting of a fixed reference bar 42 suitably mounted on a standard 44 and extending horizontally of the airplane and substantially entirely across the background of grouped indicators, and a movable arm 46. The arm 46 is carried by a stud 48 connected in known manner to a gyroscope 50 which may be of conventional type and driven in known manner. Thus, as illustrated, the arm 46 is maintained in position to indicate the horizon as it would appear to the pilot with the reference bar 42 showing the relative attitude of the airplane. The arm 46 extends substantially entirely across the partition supporting the group and provides a foreground therefor. Relative movement between the stud 48 and the partition 24 is permitted by the arcuate slot 52 in the partition and through which the stud extends.

Each of the several indicators mounted on the partition 24 is of known type and the details of construction and operation thereof is not necessary. A cover glass 58 (see Fig. 2) is provided for each of these indicators. A gaseous illumination tube 54 is arcuately shaped to extend substantially around the periphery of the chamber 26 to properly illuminate the several indicators. Thus tube 54 is operatively connected to a transformer 56 through suitable connections. To further increase the standout effect of the attitude indicator as a foreground for the grouped background indicators, a luminous composition is applied to the fixed and movable arms 42, 46 so that the relative positions between these arms will be always in view of the pilot without specific concentration on a small attitude indicator.

From the foregoing description it will be understood that the present invention provides a flight instrument which materially assists the pilot in instrument flying and one which constantly presents to the pilot his aircraft attitude without conscious concentration on this important condition. Thus the instrument of the present invention guards against errors due to pilot fatigue by presenting at all times the attitude of the aircraft for subconscious impression on the pilot even while concentrating on other instruments. When making instrument approaches to landings the utmost in concentration is required of the pilot on individual indicators making up the background of the present instrument but the foreground and co-extensive disposition of the horizon indicator makes it unnecessary for the pilot to concentrate on this condition as a separate mental process.

While one form of the invention has been shown and described for purposes of illustration, it is to be clearly understood that various changes in the details of construction and arrangement of parts may be accomplished without departing from the spirit and scope of the invention as set forth in the appended claim.

I claim:

A composite flight instrument particularly adapted for instrument flying of aircraft and comprising a plurality of pre-selected flight-condition indicators substantially symmetrically arranged in a peripheral pattern around a center portion and forming a group background, and means providing an artificial horizon indicator including a fixed reference device projecting laterally in opposite directions from the center portion of the group background and substantially trasversely coextensive with the maximum periphery of the group background with the ends thereof located between adjacent indicators, and said horizon indicator further including a movable indicating arm spaced from the plane of the group background and said reference device and substantially transversely coextensive with the maximum transverse extent of the group background and forming with said fixed reference device an enlarged foreground to present the aircraft attitude by relative positioning between the indicating arm and fixed reference device whereby the aircraft attitude is prominently displayed for subconscious vision without specific concentration thereon.

PRINCE H. GORDON.

References Cited in the file of this patent

UNITED STATES PATENTS

| Number | Name | Date |
|---|---|---|
| 1,415,158 | Cantz | May 9, 1922 |
| 1,836,881 | Sperry, Jr. | Dec. 15, 1931 |
| 1,924,037 | Henderson | Aug. 23, 1933 |
| 1,942,343 | Malik | Jan. 2, 1934 |
| 2,280,797 | Crane | Apr. 28, 1942 |

FOREIGN PATENTS

| Number | Country | Date |
|---|---|---|
| 757,811 | France | Oct. 16, 1933 |
| 46,012 | France | Dec. 3, 1935 |
| 180,224 | Switzerland | Jan. 2, 1936 |